S. B. POTTER.
AUTOMOBILE DIMMER SHADE.
APPLICATION FILED APR. 12, 1915.
1,188,483.
Patented June 27, 1916.
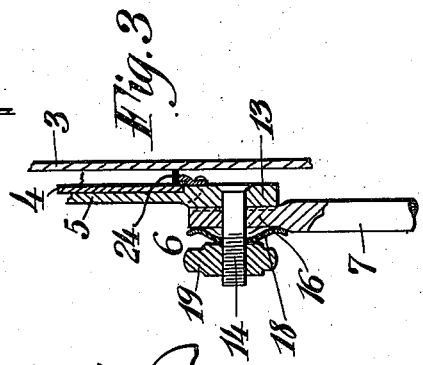
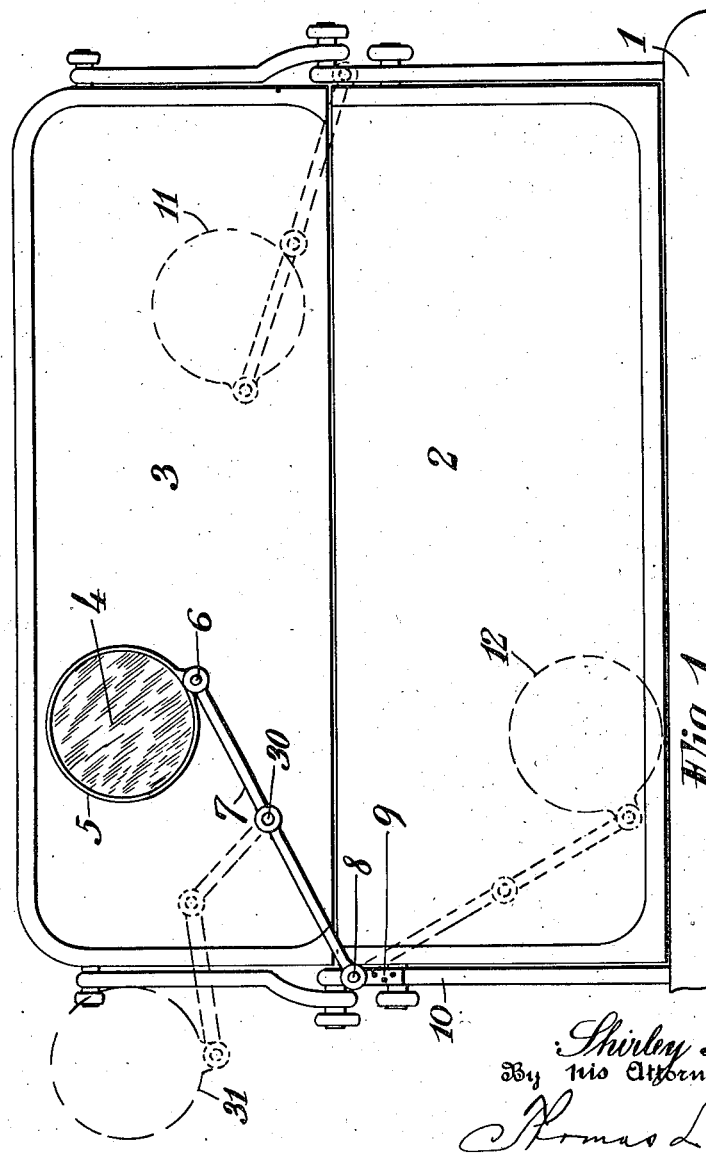
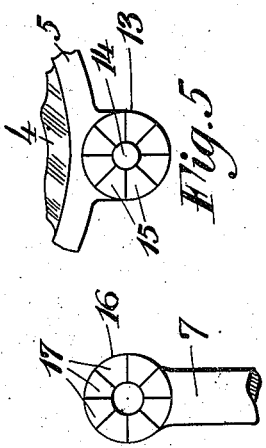
Inventor
Shirley B. Potter
By his Attorney
Thomas L. Thompson

UNITED STATES PATENT OFFICE.

SHIRLEY B. POTTER, OF ASBURY PARK, NEW JERSEY.

AUTOMOBILE DIMMER-SHADE.

1,188,483.  Specification of Letters Patent.  Patented June 27, 1916.

Application filed April 12, 1915. Serial No. 20,700.

*To all whom it may concern:*

Be it known that I, SHIRLEY B. POTTER, a citizen of the United States, and resident of Asbury Park, in the county of Monmouth and State of New Jersey, have invented certain new and useful Improvements in Automobile Dimmer-Shades, of which the following is a specification.

This invention relates to improvements in automobile dimmer shades and the object of the invention is to provide a dimmer shade or eye protecting shield of simple, practical and improved construction adapted to be secured to the windshield or dashboard of an automobile or other vehicle or to be used on a motorboat or other vessel.

One object of the invention is to provide a dimmer shade having a wide range of adjustability.

Another object is to provide means for preventing rattling or noise caused by the vibrations of the car.

Still other objects will appear as this specification proceeds.

To this end my invention comprises the parts and elements arranged and combined as hereinafter set forth and as illustrated in the accompanying drawing in which, Figure 1 is a view of a windshield of an automobile equipped with a dimmer shade, embodying my invention. Fig. 2 is a side view with parts removed and partly in section. Fig. 3 is an enlarged detail view of the mounting of the shade and Figs. 4 and 5 are detail views of parts of the adjusting mechanism.

In the drawing the numeral 1 represents the dash board of an automobile, upon which is mounted the two-part windshield 2—3. The construction of the latter need not be described in detail as the application and use of my invention does not depend upon the particular type of windshield used. Neither do I wish to be limited in the use of my invention to a windshield, but my improved dimmer shade may be mounted on any suitable supporting means on a vehicle or boat.

As is well known, the object of providing a dimmer shade, is to furnish a means for protecting the eyes of a driver or pilot against the glare from a light approaching in the opposite direction, as well as to protect the eyes against the glare or reflection from water, sandy white stretches of roads and in general to protect the eyes of the driver or pilot. To this end my invention provides a dimmer shade or eye shield 4, preferably comprising a circular shield or pane of suitably colored glass or similar material and mounted in a suitable frame 5 which is pivoted at 6 to a shade arm or support means 7, which may be jointed with a friction joint at 30. The latter is in turn pivoted at 8 to a suitable bracket or other supporting means 9 secured to the windshield frame 10 or other part. By the above construction it will be seen that the dimmer shade may be adjusted into any position to suit the line of vision of a driver or pilot and as shown at 11, the dimmer shade may be used on either the right or the left side of the windshield or two dimmer shades may be used if desired. At 12 I have shown the dimmer shade moved into its lowermost position where it is out of the way when not wanted. And at 31 the shade is shown adjusted outside the windshield. Thus it will be seen that my dimmer shade or eye shield comprises the main parts 4, 7 and 9. The detailed construction and form of the various parts is immaterial.

In the present instance the various parts are connected and mounted as follows: The shade frame 5 is provided with a lug to which there is secured a stud or bolt 14. The lug 13 is provided with cam surfaces 15, Fig. 5. The shade arm 7 is provided with an eye 16 having cam surfaces 17 adapted to coact with the surfaces 15 on the lug in a well known manner.

18 is a spring washer and 19 a nut in threaded engagement with bolt 14.

It will be apparent that the shade 4 may be adjusted relatively to the arm 7 by a mere movement of the hand, when the cam surfaces 15 and 17 will slip upon each other and hold the shade firmly in the adjusted position under tension of the spring washer 18. By tightening the nut 19 the tension of the spring washer may be adjusted. The lower end of the arm 7 is provided with an eye 20 and the bracket 9 is provided with a lug 21, which latter and the said eye 20 have cooperating cam surfaces similar to those above described.

22 is a bolt on the bracket 9 and 23 a nut corresponding to the bolt 14 and nut 19 aforesaid.

In order to prevent the shade from hitting the windshield there may be provided a rubber ring or similar suitable member 24 secured to the shade frame 5 in any desired manner on the side thereof toward the windshield. It is obvious that the member 24 forms a cushion between the shade and the windshield, yet presents no obstacle to the adjustment of the shade. If desired, the member 24 may be in the form of buttons on the frame 5.

From the foregoing it will be seen that I have provided an eye shield or dimmer shade of a simple construction adapted to be attached very easily and possessing a wide range of adjustability.

The invention is susceptible to changes in construction and forms of the various parts and I claim all such changes and modifications as come within the principle of the invention and the scope of the appended claim.

I claim:

As a new article of manufacture, a dimmer shade for automobile windshields comprising a supporting bracket adapted to be secured to the frame of the windshield, an arm pivoted frictionally to said supporting bracket, a second arm pivoted frictionally to said first arm, a shade member pivoted frictionally to the said second arm, the axes of the said three pivots being parallel at a right angle to the plane of the shade member for adjusting the latter parallel to the windshield and an annular rubber ring secured to said shade member on the side toward the windshield.

Signed at Asbury Park in the county of Monmouth and State of New Jersey this 5th day of April A. D. 1915.

SHIRLEY B. POTTER.